United States Patent [19]

Fong

[11] Patent Number: 4,645,813
[45] Date of Patent: Feb. 24, 1987

[54] CATIONIC FLUORO POLYMERS

[75] Inventor: Dodd W. Fong, Naperville, Ill.

[73] Assignee: Nalco Chemical Company, Oak Brook, Ill.

[21] Appl. No.: 786,406

[22] Filed: Oct. 10, 1985

Related U.S. Application Data

[63] Continuation-in-part of Ser. No. 642,226, Aug. 20, 1984, abandoned.

[51] Int. Cl.$^4$ .............................................. C08F 14/18
[52] U.S. Cl. .................................................. 526/247
[58] Field of Search ........................................ 526/247

[56] References Cited

U.S. PATENT DOCUMENTS

| | | | |
|---|---|---|---|
| 2,883,370 | 4/1959 | Price | 526/247 |
| 3,864,318 | 2/1975 | Caporiccio et al. | 526/247 |
| 3,996,281 | 12/1976 | Huber-Emden et al. | 526/247 |

*Primary Examiner*—Paul R. Michl
*Attorney, Agent, or Firm*—John G. Premo; Donald G. Epple; Anthony L. Cupoli

[57] ABSTRACT

Polymers of a new perfluoro substituted vinyl quaternary ammonium salt are synthesized and described. The monomer which is preferably used to form polymers has the following structure:

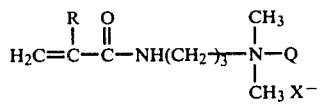

wherein R is hydrogen or lower alkyl; and Q is a quaternizing agent represented by:

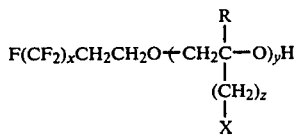

wherein:
x is an integer or fractional integer ranging between 2–12;
y is an integer or fractional integer ranging between 1–20;
z is 1 or 2;
R is a hydrogen or lower alkyl group ($C_1$–$C_4$); and
X is a halogen from the group Cl, Br, I, and mixtures thereof.

5 Claims, No Drawings

CATIONIC FLUORO POLYMERS

This is a continuation-in-part of patent application Ser. No. 642,226, filed Aug. 20, 1984, now abandoned.

INTRODUCTION

The presence of certain perfluoro quaternizing agents make available for the first time the potentialities of synthesizing vinyl quaternary ammonium salts which may be used to form certain water-soluble or dispersible polymers, with said polymers having incorporated therein perfluoro functionality. By such incorporation, these polymers become extremely active in regards to applications related to surface-active materials such as surfactants, water and oil repellants, soil repellants, non-oily lubricants, and formulations used in foaming and wetting agents, amd the like.

It would therefore be an advance in the art if a vinyl quaternary ammonium salt could be synthesized and said salt would be capable of incorporation into a water-soluble or dispersible polymer.

THE INVENTION

I have discovered that by following synthetic procedures using particularized perfluoro quaternizing agents, that I have been able to synthesize and use a vinyl quaternary ammonia salt having the formula:

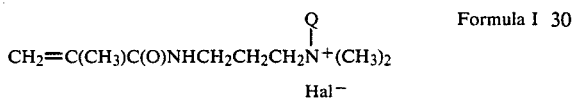

Formula I where Q is from a quaternizing agent containing perfluoro functionality, said agent having the formula:

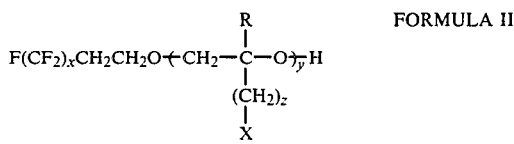

FORMULA II where:

x is an integer or integer fraction having an average value between 2–12, preferably 4–10, and most preferably 6–8;

y is an integer or an integer fraction having an average value between 1–20, preferably 1–10, and most preferably 1;

z is 1 or 2;

R is chosen from the group consisting of hydrogen or methyl groups, and

X is a halide chosen from the group consisting of chlorine, bromine, and iodine.

As is apparent, the radical Q is everything represented by Formula II except X, and in the quaternizing step, X becomes the halide anion represented in Formula I as Hal$^-$.

In the above formulas, the term "average value", indicates that the formula may represent an admixture of compounds which contains molecules in which x or y may be fractionally expressed such that admixtures of compounds can be represented by these formulas.

A preferred group of compounds represented by the above formulas are those in which X is a chlorine radical wherein the chlorine halogen would become a chloride anion during the quaternizing step. This reaction would be expected to yield a vinyl quaternary ammonium salt in the chloride salt form.

The vinyl quaternary ammonium salts represented in Formula I above are prepared by reacting a known vinyl monomer, methacrylamido-propyl-dimethyl amine with certain perfluoro substituted aliphatic halides which are generally described in U.S. Pat. Nos. 4,377,710 and 4,408,043, which are incorporated herein by reference. The quaternization reaction is reasonably well-known and involves the formation of a cationically-charged nitrogen group from an initial amine compound, preferably a di- or tri-substituted amine compound with a halogen compound, said halogen compound in this case also containing perfluoro substitution as represented by the radical demonstrated in Formula II above.

My invention is also directed to the homo- and co-polymers which may be formed using the vinyl quaternary ammonium salts represented in Formula I above. The polymers of this invention have utility in areas in which perfluoro functionality is known to be effective, for example, in surfactants, water and oil repellents, leather-treating agents, soil repellents, non-oily lubricants, foaming and wetting agents, and the like.

THE PERFLUORO QUATERNIZING AGENTS

The starting perfluoro compounds which are used to generate perfluorinated substituents within the compositions of this invention are derived from perfluoro substituted ethanols which are represented by Formula III:

Formula III

In the above Formula III, x has the numerical values previously indicated in Formula II. A preferred perfluoro ethanol is commercially obtained from E. I. du-Pont de Nemours & Co. under the commercial name, "Zonyl BA." This material is described by Formula III wherein x is equal to 6, 8, 10, and 12, and wherein the average x is equal to about 8. An average x, again, indicates that the compounds used may be an admixture of molecules wherein x is individually 6, 8, 10, 12, and the like with the numerical average being about 8.

The Oxiranes and Substituted Oxiranes

The starting oxirane and substituted oxirane used to initially react with the perfluorinated alcohols are chosen from the group consisting of ethylene oxide, propylene oxide, butylene oxide and mixtures thereof. The preferred oxirane reactants are chosen from the group consisting of ethylene oxide, propylene oxide and mixtures thereof. The most preferred oxirane reactant is ethylene oxide.

The Epihalohydrins

The epihalohydrins used to react with the perfluorinated alcohol or with the oxirane reacted perfluorinated alcohols are chosen from the group consisting of epichlorohydrin, epibromohydrin, and epiiodohydrin. Preferred is epichlorohydrin.

As previously indicated, these compounds are fully described in, for example, U.S. Pat. No. 4,408,043. The method of preparing the perfluoro quaternizing agents may be accomplished by using the synthetic techniques described in U.S. Pat. No. 4,408,043.

The quaternization of the substituted methacrylamides used to prepare the compounds of the invention may be done using convention synthetic techniques. Also, see, for example, those set forth in U.S. Pat. No. 4,408,043.

To illustrate the preparation of typical vinyl quaternary ammonium salts of the invention, the following are presented by way of example.

EXAMPLE 1

Quaternization of DMAPMA[1] with Zonyl BA-Epichlorohydrin Adduct

To a 300 ml Parr autoclave was added 15.8 g DMAPMA, 58.5 g Zonyl BA-1.5 equivalent epichlorohydrin adduct and 100 g methanol. The reactor contents were heated to and maintained at 100° C. for two hours. Very small amount of quat was formed. The reaction was then heated to 120° C. for five hours. C-13 NMR analysis of the product showed over 90% of the DMAPMA was quatted.

[1]DMAPMA=Dimethylaminopropyl methacrylamide

EXAMPLE 2

Quaternization of DMAPMA with Zonyl BA-8 Equivalent Ethylene Oxide-1.5 Equivalent Epichlorohydrin Adduct To a 300 ml Parr autoclave was added 7.3 g DMAPMA, 40 g Zonyl BA-8 equivalent ethylene oxide-1.5 equivalent epichlorohydrin adduct and 47 g methanol. The reaction was run at 120° C. for three and one-half hours. C-13 NMR analysis of the product showed 50% of the DMAPMA was quatted.

The monomer prepared in Example 1 was homopolymerized, which synthesis is set forth below in Example 3.

EXAMPLE 3

To a 100 ml test tube was added 25 g monomer of Example 1, 0.07 g Azo initiator, 0.1 g benzoin isopropyl ether. The solution was purged with nitrogen and the tube was capped. The tube was exposed to black light for 24 hours. IR of the product showed the disappearance of the 1620 cm$^{-1}$ band.

EXAMPLE 4

Copolymerization of Monomer of Example 1 and Stearyl Methacrylate

To a reactor was added 10 g monomer of Example 1, 8 g stearyl methacrylate, 12 g Freon TF, and 6 g methanol. The solution was purged with nitrogen and then heated to 50° C. Azo 52 (0.12 g) initiator was added to the monomer solution and the reaction was kept at 50° C. for one and one-half hours. Very viscous solution formed. IR of the reaction mixture showed a weak band at 1620 cm$^{-1}$. To ensure complete polymerization, Azo 52 (0.2 g) was added, and the reaction was run for extra 2¾ hours at 50° C. The product was a solid at room temperature.

EXAMPLE 5

Homopolymerization of the monomers described above would be expected to be accomplished by solution of these monomers in an appropriate solvent such as water, followed by the addition of a free radical catalyst such as those catalysts used above, and a reaction time and temperature similar to those times and temperatures used above. A homopolymer would be expected to be formed which would have surface active properties.

EXAMPLE 6

If one were to add to a reactor 10 grams of the monomer of Example 2, 10 grams of acrylamide, and 25 grams of Freon TF along with about 10 grams of methanol, then purge this solution with nitrogen and heat it to about 50° C., then add about 1 gram of Azo 52 free radical catalyst initiator to this solution of monomers, one would expect to receive a copolymer containing acrylamide and the monomer of Example 1 after a reaction time of at least 2 hours. The polymer would be expected to be water-soluble and/or water dispersible and have surface active characteristics.

While the above examples have illustrated the preparation of the novel vinyl monomers of the invention and their polymerization to produce homo and copolymers, it will be understood the invention is capable of modifications.

Vinyl monomers other than steryl methacrylate may be used to prepare the copolymers of the invention. Thus, such monomers as acrylonitrile, styrene, methyl, ethyl, and propyl acrylate, alpha methyl styrene, acrylamide, methacrylamide, maleic anhydride, acrylic acid, allyl monomers such as allyl chloride, diallyl amine, and the like may be used in the preparation of such copolymers.

When it is desired to use the copolymers for such oil repellant and surfactant effects, best results are achieved when the copolymers contain between about 3-50% by weight of the novel monomers of the invention.

Having thus described my invention, I claim:

1. Polymers of a vinyl quaternary ammonium salt having the formula:

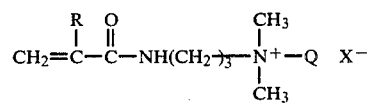

wherein Q is a quaternizing radical obtained from a perfluoro quaternizing agent having the formula:

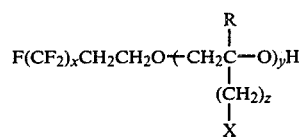

wherein:
x is an integer or fractional integer having an average value between 2–12;
y is an integer or fractional integer having an average value between 1–20;
z is 1 or 2;
R is, individually, at each occurrence chosen from the group hydrogen or methyl; and
X is a halogen chosen from the group consisting of Cl, Br, I, and mixtures thereof.

2. Polymers of the vinyl quaternary ammonium salt of claim 1 wherein:
x has an average value between 6–8;
y is an average value of 1;
z is one;
R is hydrogen at each occurrence; and
X is chloride.

3. Polymers of the vinyl quaternary ammonium salt having the formula:

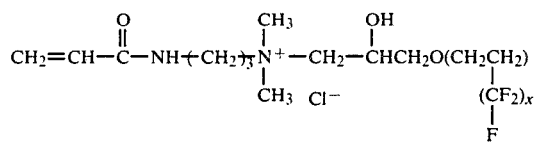

wherein x has an average value between 6-8.

4. A copolymer of a vinyl quaternary ammonium salt having the formula:

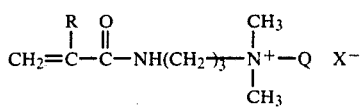

wherein Q is a quaternizing radical obtained from a perfluoro quaternizing agent having the formula:

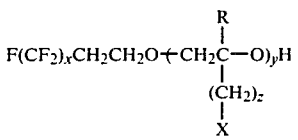

wherein:
- x is an integer or fractional integer having an average value between 2-12;
- y is an integer or fractional integer having an average value between 1-20;
- z is 1 or 2;
- R is, individually, at each occurrence chosen from the group hydrogen or methyl; and
- X is a halogen chosen from the group consisting of Cl, Br, I, and mixtures thereof, whereby the copolymer contains from 3-50 mole percent of the vinyl quaternary ammonium salt.

5. The copolymer of claim 4 wherein the vinyl quaternary ammonium salt is copolymerized with stearyl methacrylate.

* * * * *